United States Patent Office 3,326,600
Patented June 20, 1967

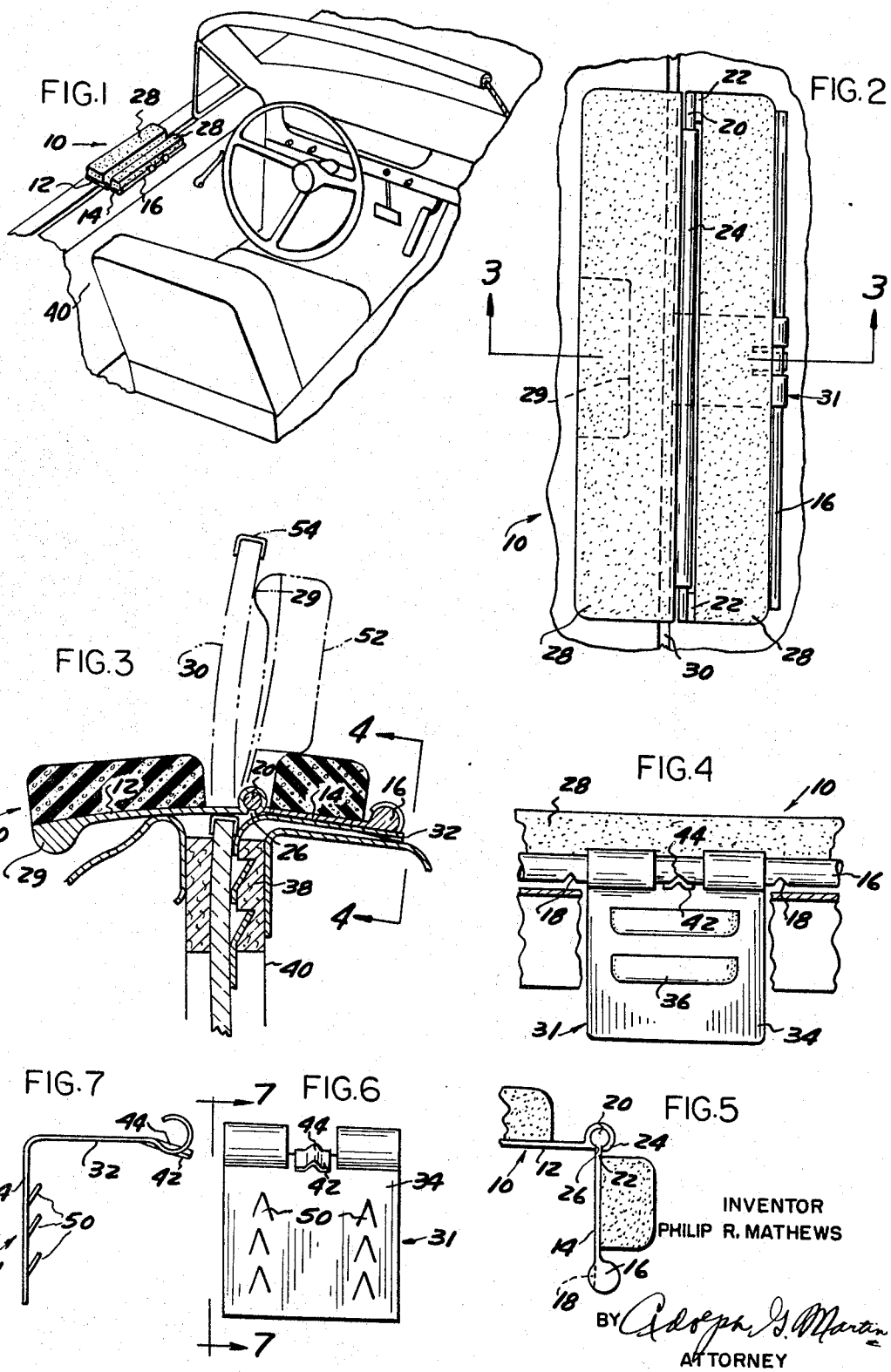

3,326,600
AUTOMOBILE WINDOW ARM REST
Philip R. Mathews, 21084 Dean, Romulus, Mich. 48174
Filed Oct. 12, 1965, Ser. No. 495,278
4 Claims. (Cl. 296—153)

ABSTRACT OF THE DISCLOSURE

An automobile window arm rest having a pair of pivotally connected support members adjustably mounted on a connector adapted to engage the molding around the vehicle window so as to support the arm rest in a lateral position. The outer support member is swingable inside the vehicle so that the window glass may be raised without detaching the arm rest from the molding.

---

This invention relates to automobile accessories generally, and more particularly to an arm rest for attachment to the window sill of an automobile.

It is common practice for vehicle drivers and passengers alike to lower the window adjacent their seat, and rest their arms or elbows on the sill. As the sill and adjoining vehicle components are usually dusty and covered with a film of road grime, the arm and clothing of the occupant is usually soiled by contact with these surfaces. Furthermore, since these parts are usually constructed of metal, they are uncomfortably hard, and become too hot in warm weather for comfortable contact with the skin.

Continued contact of these vehicle components with the skin, will also result in damage of the metal finish, as a consequence of the chemicals present in the perspiration and moisture from the arm. Aware of this situation, the applicant has, as the primary object of his invention, the provision of a cushioned protective arm rest for the window sill of a motor vehicle, which is readily attachable without the use of screws or other mechanical fasteners.

Another object of the invention is to provide an arm rest of the type previously described, which may be pivoted inside the car to prevent stealing, without interfering with the raising and lowering of the window glass in the vehicle.

A further object of the invention is to provide an arm rest of the type previously described which may be readily adjusted on the window sill to meet individual requirements as to position.

Yet another object of the invention is to provide an arm rest of the type previously described which is sturdily constructed, and relatively inexpensive to produce.

Other features and advantages of the invention will become apparent after consideration of a detailed description of the same composed with reference to the drawings constituting a portion of this application, and in which:

FIGURE 1 is a fragmentary perspective view, showing the applicant's arm rest attached to the window sill of an automobile.

FIGURE 2 is an enlarged top fragmentary view of the arm rest in FIGURE 1, showing the pivotal connection between the two hinged members.

FIGURE 3 is an enlarged section view taken substantially on plane 3—3 in FIGURE 2, showing the elevation position of the outer hinged member when the window glass is raised.

FIGURE 4 is a fragmentary elevation view taken substantially on plane 4—4 in FIGURE 3, showing structural details of the connector.

FIGURE 5 is a fragmentary elevation view showing structural details of the pivotal connection between the two hinged members.

FIGURE 6 is an elevation view showing a modification of the connector disclosed in FIGURES 3 and 4.

FIGURE 7 is an end elevation view of the connector taken substantially on plane 7—7 in FIGURE 6, showing the upwardly disposed triangular teeth.

For a more detailed description of the invention, reference is made to the drawings in which the numeral 10 designates a lateral support comprising two detachably hinged members 12 and 14. The inner hinged member 14, has along one edge thereof, a bead 16 circular in cross section and provided on the lower side with a series of longitudinally spaced transverse triangular notches 18. A pintle bar 20, disposed along the other edge of the inner hinged member 14, is attached at each end by connector tabs 22.

The outer hinged member 12 of the lateral support 10 has along one edge thereof a tubular section 24 pivotally engaging the pintle bar 20. The tubular section 24 has a downwardly disposed longitudinal slit 26, for slidably receiving therethrough the connector tabs 22 on the pintle bar 20. A cushion or pad 28, of resilient material such as sponge rubber, is attached to the upper surface of the two hinged members 12 and 14 by an adhesive or other suitable means.

An elongated bumper 29 is provided on the lower surface of the outer hinged member 12 for contact with the window glass 30 as it is being raised and lowered. A connector 31, slidably engaged on the bead 16 of the inner hinged member 14 of the lateral support 10, has a pedestal 32, and a downwardly disposed foot 34. A series of spaced transverse ribs 36 are formed on the inner side of the foot 34 for holdably engaging the lining 38 in the vehicle panel 40.

A spring tab 42 on the pedestal 32, has a detent 44 on the upper side for selective engagement in the transverse triangular notches 18 in the bead 16. A slight modification of the connector 30 is shown in FIGURES 6 and 7. The spaced transverse ribs 36 on the foot 34 in the preferred embodiment, are replaced with upwardly disposed triangular teeth 50. In practice, the clips 31 may be used independently of the applicant's arm rest, to support snack trays, ash receptacles, map holders, and other accessories inside a motor vehicle.

The above discussion completes a description of the structural details of the invention herein disclosed; however, to more fully comprehend and appreciate the subject matter presented, a discussion is immediately hereinafter directed to the manner in which the device is attached to the vehicle, and used so as to perform its intended function, and achieve the objectives previously set forth.

In use, the arm rest is attached to an automobile by placing the outer face of the foot 34 of the connector 31 in contact with the window glass 30. A downward force of sufficient magnitude is then applied to the inner hinged member 14 so as to force the foot 34 of the connector 31 between the window molding and the glass 30, and move it downwardly to the position shown in FIGURE 3. In this position, the transverse ribs 36 become holdably engaged in the lining 38 adjacent the glass 30 so as to retain the arm rest in its assigned position on the vehicle sill.

The lateral support 10 of the arm rest may then be adjusted to the desired position by applying a longitudinal force to dislodge the detent 44 from the triangular notch 18 in which it is seated. The lateral support 10 may then be shifted to a position best suited to the user, and the detent 44 again engaged in the nearest triangular notch 18.

When it is desired to elevate the window glass 30, the outer hinged member 12 is pivoted inwardly to the broken line position 52, shown in FIGURE 3. The elongated bumper 29, because of its general configuration, slidably engages the glass 30 or any metal frame member 54 there on, and prevents the window from hanging up as it is raised and lowered.

Based upon the foregoing discussion, the applicant is of the opinion that his invention has fulfilled a long-felt need in the field of automobile accessories, and that he had accordingly made a valuable contribution to the related art. However, while the invention was described with reference to the structural details of a single embodiment, it will be appreciated by those skilled in the art, that the principles involved are susceptible of numerous other practical adaptations.

Therefore, I claim as new and desire to secure by Letters Patent:

1. An arm rest for attachment to the sill of a window in a motor vehicle, such arm rest comprising an outer support member, a split tubular member along one edge of the outer support member, an inner support member, a pintle along one edge of the inner support member pivotally engaged in the split tubular member, a bead along the other edge of the inner support member, a connector adjustably engaged on the bead, a foot on the connector for insertion between the glass and the molding around the vehicle window, and means on the foot for holdably engaging the lining adjacent the glass of the vehicle window.

2. The arm rest of claim 1 in which the foot has thereon transverse ribs for holdably engaging the lining adjacent the glass of the vehicle window.

3. The arm rest of claim 1 in which the foot has thereon upwardly disposed teeth for holdably engaging the lining adjacent the glass of the vehicle window.

4. The arm rest of claim 1 having in addition thereto a resilient member on the connector yieldably engaging the bead.

References Cited
UNITED STATES PATENTS

| | | | |
|---|---|---|---|
| 2,536,895 | 1/1951 | West | 296—153 |
| 2,697,632 | 12/1954 | Shapiro | 296—153 |
| 2,711,344 | 6/1955 | Larson | 296—153 |
| 2,738,220 | 3/1956 | Simmons | 296—153 |

BENJAMIN HERSH, *Primary Examiner.*

PHILIP GOODMAN, *Examiner.*